(12) United States Patent
Koyanaka (10) Patent No.: US 9,665,087 B2
(45) Date of Patent: May 30, 2017

(54) NUMERICAL CONTROLLER OF MACHINE TOOL FOR DRILLING

(71) Applicant: FANUC Corporation, Minamitsuru-gun, Yamanashi (JP)

(72) Inventor: Yousuke Koyanaka, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 339 days.

(21) Appl. No.: 14/301,724

(22) Filed: Jun. 11, 2014

(65) Prior Publication Data

US 2014/0379115 A1 Dec. 25, 2014

(30) Foreign Application Priority Data

Jun. 20, 2013 (JP) .................... 2013-129599

(51) Int. Cl.
*G05B 19/416* (2006.01)
(52) U.S. Cl.
CPC ........... *G05B 19/4166* (2013.01); *G05B 2219/41109* (2013.01); *G05B 2219/49093* (2013.01)
(58) Field of Classification Search
None
See application file for complete search history.

(56) References Cited

U.S. PATENT DOCUMENTS

| | | | |
|---|---|---|---|
| 5,598,512 A * | 1/1997 | Niwa ................ | G06N 7/04 706/52 |
| 5,599,142 A * | 2/1997 | Fujimoto .......... | B23Q 15/12 408/10 |
| 6,257,348 B1 | 7/2001 | Momochi et al. | |
| 2010/0207567 A1 | 8/2010 | Mori et al. | |
| 2011/0063122 A1 | 3/2011 | Matsubara et al. | |
| 2013/0189043 A1 | 7/2013 | Uchiuzo et al. | |

FOREIGN PATENT DOCUMENTS

| | | |
|---|---|---|
| CN | 1836838 A | 9/2006 |
| CN | 101842189 A | 9/2010 |
| CN | 102023608 A | 4/2011 |
| JP | S57-205013 A | 12/1982 |
| JP | S60-228009 A | 11/1985 |
| JP | S60-263606 A | 12/1985 |
| JP | H05-50311 A | 3/1993 |
| JP | H07-195256 A | 8/1995 |
| JP | H11-65633 A | 3/1999 |
| JP | H11-216640 A | 8/1999 |
| JP | 2000-3213 A | 1/2000 |
| JP | 2002-120219 A | 4/2002 |
| JP | 2004-141991 A | 5/2004 |
| JP | 2012-016793 A | 1/2012 |
| WO | WO 2012/160379 A1 | 11/2012 |

OTHER PUBLICATIONS

Decision to Grant a Patent dated Apr. 14, 2015, along with its English-language translation, in corresponding Japanese Patent Application 2013-129599.

\* cited by examiner

*Primary Examiner* — Mohammad Ali
*Assistant Examiner* — Saad M Kabir
(74) *Attorney, Agent, or Firm* — Drinker Biddle & Reath LLP (57) ABSTRACT

A numerical controller of a machine tool changes a feed speed of a feed shaft and a spindle rotation speed, in accordance with a current position of a rotary tool in a specified arbitrary area above and below a position where a workpiece and the rotary tool come in contact with each other.

4 Claims, 7 Drawing Sheets

NUMERICAL CONTROLLER OF MACHINE TOOL FOR DRILLING

RELATED APPLICATION DATA

This application claims priority under 35 U.S.C. §119 and/or §365 to Japanese Application No. 2013-129599 filed Jun. 20, 2013, the entire contents is incorporated herein by reference.

BACKGROUND OF THE INVENTION

1. Field of the Invention

The present invention relates to a numerical controller of a machine tool and, more particularly, to a numerical controller of a machine tool that performs drilling.

2. Description of the Related Art

For drilling a hole in a workpiece, a drilling apparatus is known that causes a relative rotary motion and a relative feeding motion between a workpiece and a tool, and thereby drills a hole. In conventional drilling, predetermined fixed speeds were used as the feed speed for the feeding motion and the rotation speed for the rotary motion. This may cause a problem in that the tool receives a large load when contacting the workpiece, possibly affecting the service life and the straightness of the tool.

As prior art techniques concerning the speed control of tools in drilling, the techniques disclosed in the patent documents cited below are known.

Japanese Patent Application Laid-Open JP11-216640A discloses a technique described below. In a process of cutting, segments of the machining area in a workpiece are defined as a chamfer, a depth, a penetration in the order of machining for each of which a cutting operation for a fixed depth of cut is repeated. The cutting feed speed of the tool is set to be higher in the order of at the depth, at the chamfer, and at the penetration and the rotation speed of the tool is set to be lower at the penetration than at the chamfer and at the depth. The feed speed and the spindle rotation speed are thus changed to predetermined speeds for each of the defined areas when machining of the area is started.

Japanese Patent Application Laid-Open JP5-050311A discloses a technique described below. In deep hole machining, the feed speed of the cutting shaft is temporarily decreased to the stress-removing feed speed at predetermined intervals, whereby the stress applied on the cutting tool is reduced or relieved to become zero. While this operation is performed, the bent shape of the cutting tool is restored to the original state thereof with the elasticity thereof.

Japanese Patent Application Laid-Open JP2002-120219A discloses a technique described below. In a method of piercing a hole into a fragile material, after the tip of the tool reaches a specific point that is a specified distance away from the piecing point inside the fragile material until the tip of the tool passes through the piercing point, the tool is advanced with the speed thereof switched to a low speed, whereby cracks are prevented on the back face of the fragile material.

Japanese Patent Application Laid-Open JP11-065633A discloses a technique of changing the ratios of the feed speed and the spindle rotation speed with respect to a specified area using an override function.

Japanese Patent Application Laid-Open JP2004-141991A discloses a technique described below. In tap hole forming work for forming a hole in a workpiece having a prepared hole, a tap tool that is rotated by a spindle is inserted in and removed from the workpiece to form a hole, of which the depth and the diameter are predetermined. A torque required for cutting is calculated and the rotational angular acceleration is adequately controlled, whereby the torque of the spindle motor is sufficiently utilized and the work efficiency is improved.

Japanese Patent Application Laid-Open JP2012-016793A discloses a technique described below. When a hole is formed in a workpiece having a plurality of hole-forming areas made of different materials and thus segmented, the load torque applied on the tool is used for determining change of materials and the feed speed and the spindle speed are automatically controlled for each different material.

The technique disclosed in Japanese Patent Application Laid-Open JP11-216640A is a technique of changing the feed speed and the spindle rotation speed according to the chamfer, the depth, and the penetration. However, the technique changes the feed speed and the spindle rotation speed after the tool has come in contact with the workpiece. This may cause a problem in that the specified speeds have been reached before the start of a cutting-in operation and adequate acceleration thus cannot be performed during cutting.

The technique disclosed in Japanese Patent Application Laid-Open JP5-050311A decreases the feed speed at predetermined intervals. However, the purpose of the decreasing is to reduce or zero out the stress applied on the tool to restore the bent shape of the cutting tool. Furthermore, because the technique does not control the spindle rotation speed, the load applied on the tool may not be sufficiently reduced.

The technique disclosed in Japanese Patent Application Laid-Open JP2002-120219A switches the feed speed of the tool to a low speed at a specific point inside a fragile material. However, the technique switches the feed speed at a specific point inside a fragile material which is the workpiece. This may cause a problem in that the specified speeds have been reached before the start of a cutting-in operation and adequate acceleration thus cannot be performed during cutting. Furthermore, because the technique does not control the spindle rotation speed, the load applied on the tool may not be sufficiently reduced.

The technique disclosed in Japanese Patent Application Laid-Open JP11-065633A specifies areas inside the workpiece and controls the feed speed and the spindle rotation speed for each area. However, the technique controls the feed speed and the spindle rotation speed after the tool come in contact with the workpiece, and it is thus difficult to reduce the load applied on the tool contacting the workpiece during drilling.

The technique disclosed in Japanese Patent Application Laid-Open JP2004-141991A is intended for forming a tap hole in a workpiece having a prepared hole and based on the assumption that the prepared hole has been formed before machining. The purpose of the machining is forming a tap hole, that is, forming a screw groove in the hole, and it is thus difficult to reduce the load applied on the tool contacting the workpiece during drilling.

The technique disclosed in Japanese Patent Application Laid-Open JP2012-016793A detects the load torque applied on the tool coming in contact with the workpiece to change the machining speed. However, the technique changes the feed speed and the spindle rotation speed after the tool has come in contact with the workpiece, and it is thus difficult to reduce the load applied on the tool contacting the workpiece during drilling.

SUMMARY OF THE INVENTION

The object of the present invention is to provide a numerical controller of a machine tool for drilling that accelerates the feed speed of a shaft moving the tool and the rotation speed of a spindle rotatably driving the tool each at an optimum specified arbitrary speed ratio in accordance with the position of the tool in a specified arbitrary area set before and after the point where the tool comes in contact with a workpiece. This configuration can reduce the load applied on the tool when the tool contacting the workpiece starts a cutting-in operation, whereby the tool can have a prolonged service life and maintain high straightness.

The numerical controller according to the present invention includes a feed shaft configured to move a rotary tool and a spindle configured to rotatably drive the rotary tool to perform drilling work for forming a hole in a workpiece using the rotary tool. The numerical controller further includes specified arbitrary area configured to set unit, updating unit configured to update a current position of the feed shaft configured to move the rotary tool, and speed changing unit. The specified arbitrary area setting unit sets a specified arbitrary area including a contact position where the workpiece and the rotary tool come in contact with each other for the first time, before and after the contact position in the machining direction of the rotary tool. The speed changing unit changes a feed speed of the feed shaft and a spindle rotation speed of the spindle in accordance with the current position of the rotary tool when the current position of the rotary tool is in the specified arbitrary area.

The specified arbitrary area includes the position where the rotary tool and the workpiece come in contact with each other and is set before and after the contact position in the machining direction of the rotary tool. In the specified arbitrary area, the feed speed and the spindle rotation speed of the rotary tool are changed in accordance with the current position. With this configuration, the feed speed and the spindle rotation speed of the rotary tool can be adequately controlled when the rotary tool and the workpiece come in contact with each other and the load applied on the tool can be reduced when the tool contacts the workpiece during drilling.

The numerical controller further includes instructing unit and speed ratio calculating unit. The instructing unit instructs a hole bottom position being the position where drilling ends, a drilling instruction start position, a drilling feed speed during drilling, a drilling spindle rotation speed during drilling, a specified arbitrary area start position, and a specified arbitrary area end position, a specified arbitrary feed speed ratio, which is a ratio to the reference feed speed, and a specified arbitrary spindle rotation speed ratio. The specified arbitrary feed speed ratio is a speed ratio with respect to the drilling feed speed during drilling from the drilling instruction start position to the specified arbitrary area start position, and the specified arbitrary spindle rotation speed ratio is a speed ratio with respect to the drilling spindle rotation speed during drilling from the drilling instruction start position to the specified arbitrary area start position. The speed ratio calculating unit calculates a feed speed ratio of the feed shaft of the rotary tool in the current position from the specified arbitrary feed speed ratio in the specified arbitrary area and calculates a spindle rotation speed ratio of the spindle from the specified arbitrary spindle rotation speed ratio. The speed changing unit can calculate the feed speed and the spindle rotation speed in the current position from the feed speed ratio and the spindle rotation speed ratio.

In the specified arbitrary area, the feed speed and the spindle rotation speed of the rotary tool in the current position are calculated from the feed speed ratio and the spindle rotation speed ratio in the current position. With this configuration, the feed speed and the spindle rotation speed of the rotary tool can be adequately controlled when the rotary tool and the workpiece come in contact with each other and the load applied on the tool can be reduced when the tool contacts the workpiece during drilling.

The instructing unit further instructs the contact position where the rotary tool and the workpiece come in contact with each other for the first time in the specified arbitrary area, a contact position feed speed ratio with respect to the drilling feed speed during drilling in the contact position, and a contact position spindle rotation speed ratio with respect to the drilling spindle rotation speed during drilling in the contact position. The speed ratio calculating unit calculates a first feed speed ratio from the specified arbitrary feed speed ratio and the contact position feed speed ratio and calculates a first spindle rotation speed ratio from the specified arbitrary spindle rotation speed ratio and the contact position spindle rotation speed ratio in the current position from the specified arbitrary area start position to the contact position, and calculates a second feed speed ratio from the contact position feed speed ratio and calculates a second spindle rotation speed ratio from the contact position spindle rotation speed ratio in the current position from the contact position to the specified arbitrary area end position. The speed changing unit can calculate the feed speed and the spindle rotation speed in the current position from the first feed speed ratio and the first spindle rotation speed ratio in the current position from the specified arbitrary area start position to the contact position, and calculate the feed speed and the spindle rotation speed in the current position from the second feed speed ratio and the second spindle rotation speed ratio in the current position from the contact position to the specified arbitrary area end position.

The specified arbitrary area is divided into an area from the specified arbitrary area start position to the contact position and an area from the contact position to the specified arbitrary area end position. In each area, the feed speed and the spindle rotation speed in the current position are calculated from the feed speed ratio and the spindle rotation speed ratio. With this configuration, the feed speed and the spindle rotation speed of the rotary tool can be controlled more adequately. In particular, the feed speed and the spindle rotation speed of the rotary tool can be adequately controlled when the rotary tool and the workpiece come in contact with each other. The load applied on the tool can be thus reduced when the tool contacts the workpiece during drilling.

In a case where at least one of instructions for the specified arbitrary feed speed ratio and the specified arbitrary spindle rotation speed ratio is omitted, the speed ratio calculating unit can calculate the specified arbitrary feed speed ratio and the specified arbitrary spindle rotation speed ratio from a set feed speed instructed for the area immediately before the drilling instruction start position, the feed speed during drilling, a set spindle rotation speed instructed for the area immediately before the drilling instruction start position, and the spindle rotation speed during drilling.

Even in a case where at least one of instructions for the specified arbitrary feed speed ratio and the specified arbitrary spindle rotation speed ratio is omitted, the specified arbitrary feed speed ratio and the specified arbitrary spindle rotation speed ratio can be calculated from a set feed speed and a set spindle rotation speed instructed for the area immediately before the drilling instruction start position. With this configuration, the feed speed ratio and the spindle rotation speed ratio of the rotary tool can be adequately calculated even in a case where speed ratio instructions are omitted.

The present invention can provide a numerical controller of a machine tool for drilling that includes the configuration described above and thereby accelerates the feed speed of a shaft moving the tool and the rotation speed of a spindle rotatably driving the tool each at an optimum specified arbitrary speed ratio in accordance with the position of the tool in a specified arbitrary area set before and after the point where the tool comes in contact with a workpiece. With this configuration, the numerical controller enables reduction of the load applied on the tool when the tool contacting the workpiece starts a cutting-in operation, whereby the tool can have a prolonged service life and maintain high straightness.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS (First Embodiment)

Figure 1:
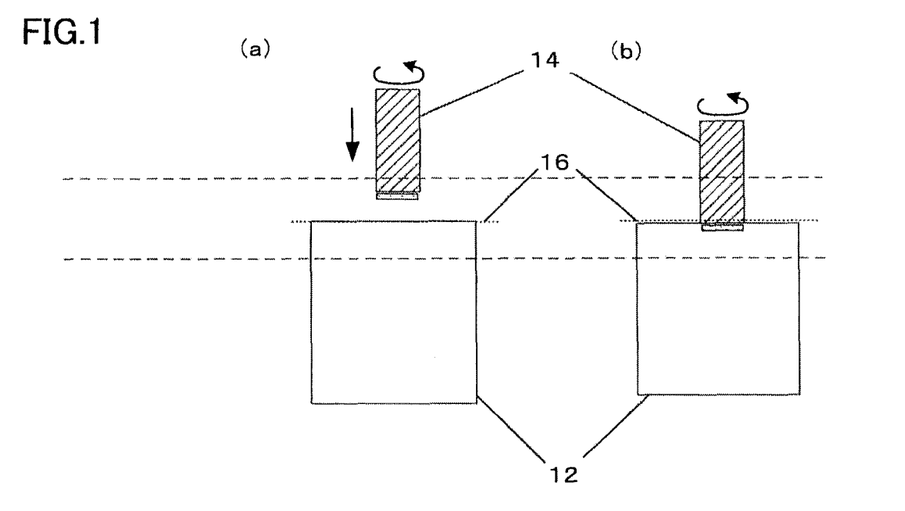
FIG. 1 is a schematic diagram illustrating machining of a workpiece using a rotary tool, as viewed from a side.

FIG. 1 illustrates machining of a workpiece using a rotary tool, as viewed from a side. Part (a) of FIG. 1 illustrates a state before a rotary tool 14 comes in contact with a workpiece 12. Part (b) of FIG. 1 illustrates a state immediately after the rotary tool 14 has come in contact with the workpiece 12 in a contact position 16. As illustrated in part (a) of FIG. 1, the rotary tool 14 has a predetermined feed speed at which the rotary tool 14 moves in the direction of the workpiece 12 and a predetermined spindle rotation speed at which the rotary tool 14 is rotated.

The rotary tool 14 has a feed speed and thus approaches the workpiece 12 gradually to come in contact with the workpiece 12, as illustrated in part (b) of FIG. 1. To perform appropriate machining, each of the feed speed and the spindle rotation speed of the rotary tool needs to be set and accelerated smoothly at an optimum speed ratio, particularly before and after the contact position.

From this point of view, in the present embodiment, a specified arbitrary area is set including a contact position where the workpiece 12 and the rotary tool 14 come in contact with each other for the first time, and set before and after the contact position in the machining direction of the rotary tool 14. In the specified arbitrary area, a feed speed ratio and a spindle rotation speed ratio of the rotary tool 14 in a current position are calculated. From the feed speed ratio and the spindle rotation speed ratio thus calculated, a feed speed and a spindle rotation speed in the current position are calculated.

Figure 2:
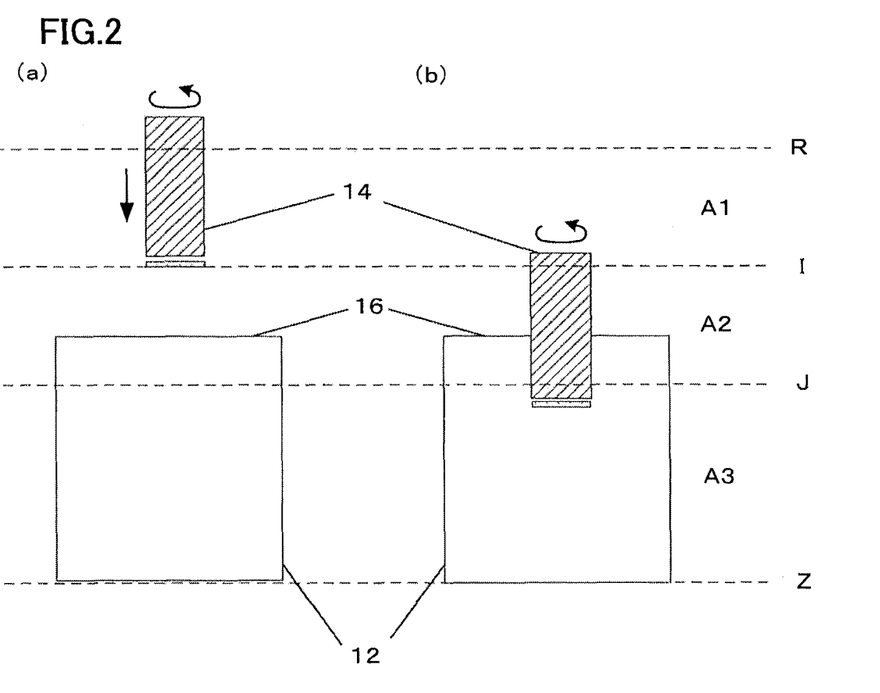
FIG. 2 is a schematic diagram illustrating machining of a workpiece using a rotary tool according to an embodiment, as viewed from a side.

FIG. 2 illustrates machining of the workpiece 12 using the rotary tool 14, as viewed from a side. Part (a) of FIG. 2 illustrates a state before the rotary tool 14 comes in contact with the workpiece 12. Part (b) of FIG. 2 illustrates a state in which the rotary tool 14 performs machining in the workpiece 12. R is a reference position which is a drilling instruction start position. I is a specified arbitrary area start position. J is a specified arbitrary area end position. Between the specified arbitrary area start position I and the specified arbitrary area end position J, a specified arbitrary area A2 is defined. The specified arbitrary area A2 includes the contact position between the tool and the workpiece. Z is a hole bottom position which is the position where the drilling ends.

Specified, at the beginning, are the hole bottom position, the drilling instruction start position which is the reference position, the specified arbitrary area start position, the specified arbitrary area end position, a feed speed during drilling, a spindle rotation speed during drilling, a specified arbitrary feed speed ratio which is the speed ratio of the feed speed from the drilling instruction start position to the specified arbitrary area start position with respect to the feed speed during drilling, and a specified arbitrary spindle rotation speed ratio which is the speed ratio of the spindle rotation speed from the drilling instruction start position to the specified arbitrary area start position with respect to the spindle rotation speed during drilling. The specified arbitrary area can be arbitrarily determined by an operator. The specified arbitrary area also can be predefined as a constant and changed in accordance with the thickness, the hardness, and the material of the workpiece 12 and the type and the size of the rotary tool 14, for example. As an example of the instruction method, an instruction can be executed using a format as below in a machining program.

G83.9Z_R_F_S_I_J_L_Q_; (_: an arbitrary value)

In the format above, G83.9 is a drilling instruction code. Z is the hole bottom position. R is the reference position which is the drilling instruction start position. F is a reference feed speed which is the feed speed during drilling. S is a reference spindle rotation speed which is the spindle rotation speed during drilling. I is the specified arbitrary area start position. J is the specified arbitrary area end position. L is the speed ratio of the feed speed from the reference position R to the specified arbitrary area start position I with respect to the reference feed speed F. Q is the speed ratio of the spindle rotation speed from the reference position R to the specified arbitrary area start position I with respect to the reference spindle rotation speed S.

The calculation method of the feed speed and the spindle rotation speed in accordance with the current position of the rotary tool 14 is described below.

(1) When the current position is in the area A1 which is from the reference position R to the specified arbitrary area start position I at the start of machining, Feed Speed($Fc$)=Reference Feed Speed($F$)×Speed Ratio($L$)

Spindle Rotation Speed($Sc$)=Reference Spindle Rotation Speed($S$)×Speed Ratio($Q$)

(2) When the current position is in the area A2 which is the specified arbitrary area, Feed Speed($Fc$)=Reference Feed Speed($F$)×((Current Position−Start Position($I$))/(End Position($J$)−Start Position($I$))×(1−Speed Ratio($L$))+Speed Ratio($L$))

Spindle Rotation Speed($Sc$)=Reference Spindle Rotation Speed($S$)×((Current Position−Start Position($I$))/(End Position($J$)−Start Position($I$))×(1−Speed Ratio($Q$))+Speed Ratio($Q$))

(3) When the current position is in an area A3 which is between the specified arbitrary area end position J and the bottom hole position Z, Feed Speed($Fc$)=Reference Feed Speed($F$)

Spindle Rotation Speed($Sc$)=Reference Spindle Rotation Speed($S$)

(Second Embodiment)

Figure 3:
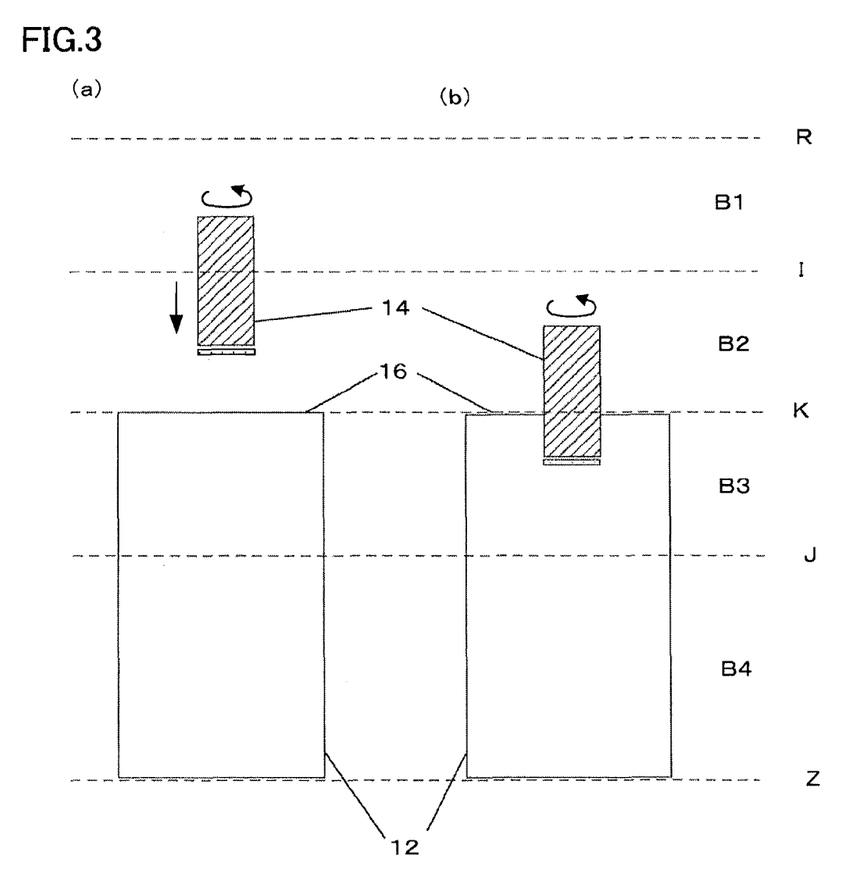
FIG. 3 is a schematic diagram illustrating machining of a workpiece using a rotary tool according to an embodiment, as viewed from a side.

In the present embodiment, a specified arbitrary area is divided into an area from a specified arbitrary area start position to a contact position and an area from the contact position to a specified arbitrary area end position, for each of which a feed speed ratio and a spindle rotation speed ratio of a rotary tool 14 in a current position are calculated, from each of which a feed speed and a spindle rotation speed in the current position are calculated.

FIG. 3 shows machining of a workpiece 12 using the rotary tool 14, as viewed from a side. Part (a) of FIG. 3 illustrates a state before the rotary tool 14 comes in contact with the workpiece 12. Part (b) of FIG. 3 illustrates a state in which the rotary tool 14 performs machining in the workpiece 12. The difference with the embodiment illustrated in FIG. 2 is that the specified arbitrary area is divided into a first specified arbitrary area B2, which is from a specified arbitrary area start position I to a contact position K, and a second specified arbitrary area B3, which is from the contact position K to a specified arbitrary area end position J, and the calculation method of the feed speed and the spindle rotation speed is thus changed.

In the present embodiment, in addition to a reference position, a hole bottom position, a drilling instruction start position, the specified arbitrary area start position, the specified arbitrary area end position, a feed speed during drilling, a spindle rotation speed during drilling, a specified arbitrary feed speed ratio which is a feed speed ratio of the feed speed from the drilling instruction start position to the specified arbitrary area start position with respect to the feed speed during drilling, and a specified arbitrary spindle rotation speed ratio of the spindle rotation speed from the drilling instruction start position to the specified arbitrary area start position with respect to the spindle rotation speed during drilling, the following items are specified: the contact position between the rotary tool and the workpiece, the speed ratio with respect to the feed speed during drilling in the contact position, and the speed ratio with respect to the spindle rotation speed during drilling in the contact position. The specified arbitrary area can be arbitrarily determined by an operator. The specified arbitrary area also can be predefined as a constant and changed in accordance with the thickness, the hardness, and the material of the workpiece 12 and the type and the size of the rotary tool 14, for example. As an example of the instruction method, an instruction can be executed using a format as below in a machining program.

G83.9Z_R_F_S_I_J_K_L_Q_P_T; (_: an arbitrary value)

In the format above, G83.9 is a drilling instruction code. Z is the hole bottom position. R is the reference position which is the drilling instruction start position. F is a reference feed speed which is the feed speed during drilling. S is a reference spindle rotation speed which is the spindle rotation speed during drilling. I is the specified arbitrary area start position. J is the specified arbitrary area end position. K is the contact position between the rotary tool and the workpiece. L is the speed ratio of the feed speed from the reference position R to the specified arbitrary area start position I with respect to the reference feed speed F. Q is the speed ratio of the spindle rotation speed from the reference position R to the specified arbitrary area start position I with respect to the reference spindle rotation speed S. P is a speed ratio of the feed speed in the contact position K with respect to the reference feed speed F. T is a speed ratio of the spindle rotation speed in the contact position K with respect to the reference spindle rotation speed S.

The calculation method of the feed speed and the spindle rotation speed in accordance with the current position of the rotary tool 14 is described below.

(1) When the current position is in the area B1 which is from the reference position R to the specified arbitrary area start position I at the start of machining, Feed Speed($Fc$)=Reference Feed Speed($F$)×Speed Ratio($L$)

Spindle Rotation Speed($Sc$)=Reference Spindle Rotation Speed($S$)×Speed Ratio($Q$)

(2) When the current position is in the area B2 which is the first specified arbitrary area from the specified arbitrary area start position I to the contact position K, Feed Speed($Fc$)=Reference Feed Speed($F$)×((Current Position−Start Position($I$))/(Contact Position($K$)−Start Position($I$))×(Speed Ratio($P$)−Speed Ratio($L$))+Speed Ratio($L$))

Spindle Rotation Speed($Sc$)=Reference Spindle Rotation Speed($S$)×((Current Position−Start Position($I$))/(Contact Position($K$)−Start Position($I$))×(Speed Ratio($T$)−Speed Ratio($Q$))+Speed Ratio($Q$))

(3) When the current position is the contact position K between the rotary tool and the workpiece, Feed Speed($Fc$)=Reference Feed Speed($F$)×Speed Ratio($P$)

Spindle Rotation Speed($Sc$)=Reference Spindle Rotation Speed($S$)×Speed Ratio($T$)

(4) When the current position is in the area B3 which is the second specified arbitrary area from the contact position K to the specified arbitrary area end position J, Feed Speed($Fc$)=Reference Feed Speed($F$)×((Current Position−Contact Position($K$))/(End Position($J$)−Contact Position($K$))×(1−Speed Ratio ($P$))+Speed Ratio($P$))

Spindle Rotation Speed($Sc$)=Reference Spindle Rotation Speed($S$)×((Current Position−Contact Position($K$))/(End Position($J$)−Contact Position($K$))×(1−Speed Ratio($T$))+Speed Ratio($T$))

(5) When the current position is in the area B4 which is from the specified arbitrary area end position J to the hole bottom position Z, Feed Speed($Fc$)=Reference Feed Speed($F$)

Spindle Rotation Speed($Sc$)=Reference Spindle Rotation Speed($S$)

(Third Embodiment)

Calculated in the present embodiment are a speed ratio L and a speed ratio Q in a case where specification has been omitted for the speed ratio L with respect to a reference feed speed F from a reference position R to a specified arbitrary area start position I and the speed ratio Q with respect to a reference spindle rotation speed S from the reference position R to the specified arbitrary area start position I.

As a specific calculation method, a calculation is performed using a set feed speed Fp and a spindle rotation speed Sp instructed for the area immediately before the reference position R which is a drilling instruction start position, as described below.

Speed Ratio $L$=Feed Speed($Fp$) for the area immediately before reference position/Reference Feed Speed($F$)

Speed Ratio $Q$=Spindle Rotation Speed($Sp$) for the area immediately before reference position/Reference Spindle Rotation Speed($S$)

The speed ratio L and the speed ratio Q thus calculated are used in the first and the second embodiments to calculate the feed speed and the spindle rotation speed in accordance with a current position of a rotary tool.

Furthermore, after reaching a hole bottom position Z, the rotary tool moves from the hole bottom position Z to the reference position R to be drawn out from a workpiece. For a feed speed Fc in this operation, the reference feed speed F is used.

The current position of the rotary tool is updated for each unit time by the addition of a movement ΔFc per unit time which can be calculated from the feed speed Fc. For example, when the unit of the current position is [mm], the unit of the feed speed Fc is [mm/min], and the unit time is 1[msec], the movement ΔFc per unit time and the current position can be calculated as below.

Δ$Fc$ [mm/msec]=$Fc$ [mm/min]×1/60000[min/msec]

Current Position new [mm]=Current Position old [mm]+Δ$Fc$ [mm/msec]×1 [msec]

Figure 4:
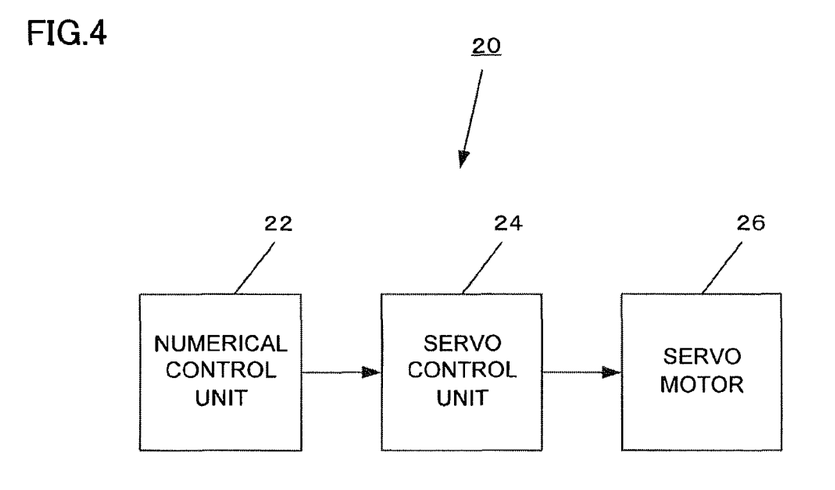
FIG. 4 is a block diagram of a numerical controller performing drilling.

FIG. 4 is a block diagram of a numerical controller 20 performing a drilling operation. The numerical controller 20 reads, analyzes, and executes the machining program described above for each block. The numerical control unit 22 performs processing in flowcharts shown in FIGS. 5A, 5B, 6A, 6B, and 6C described later and gives an instruction to a servo control unit 24. The servo control unit 24 receiving the instruction controls a servo motor 26.

Figure 5A:
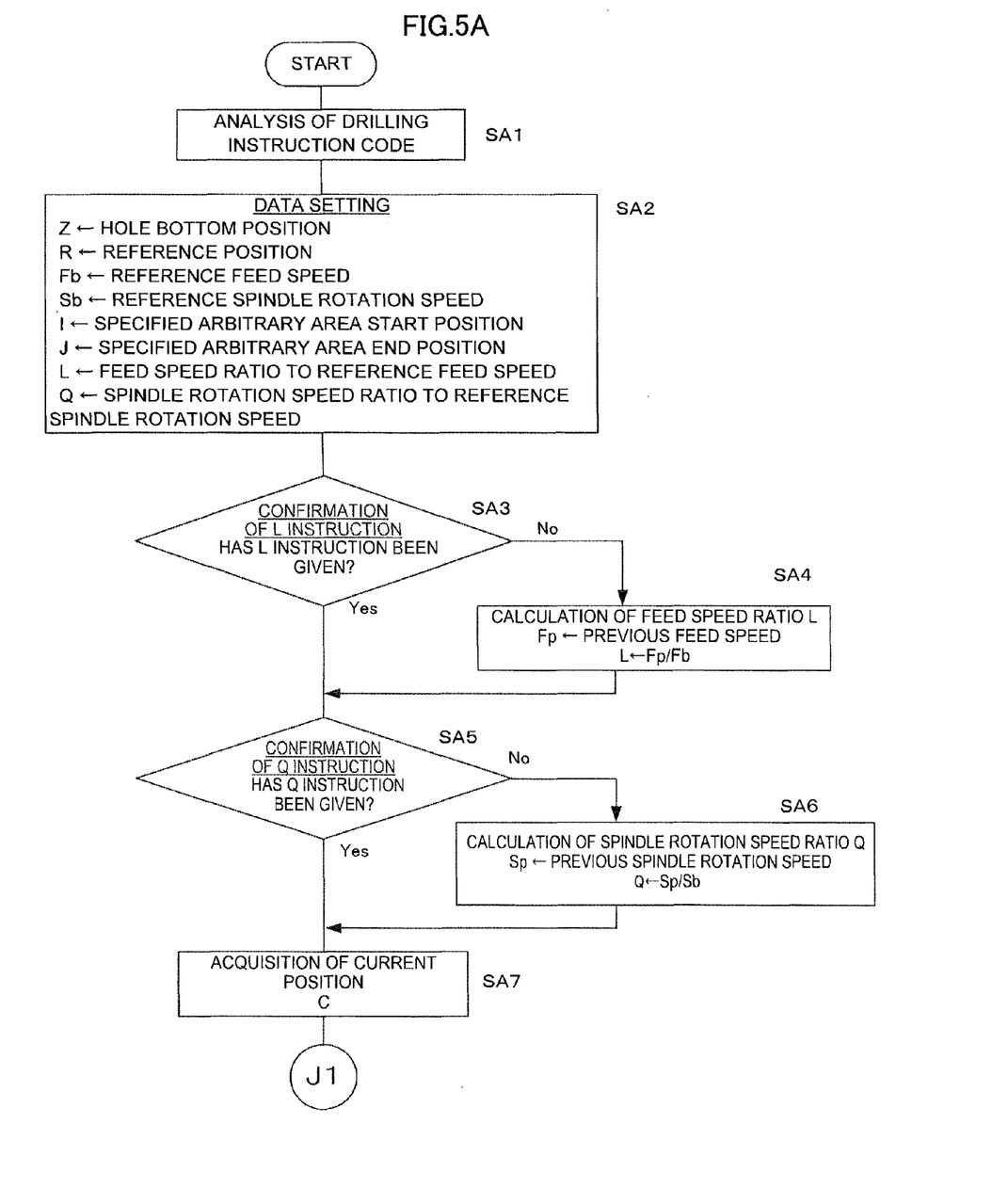
FIG. 5A is a flowchart of the flow of a calculation method in an embodiment.
Figure 5B:
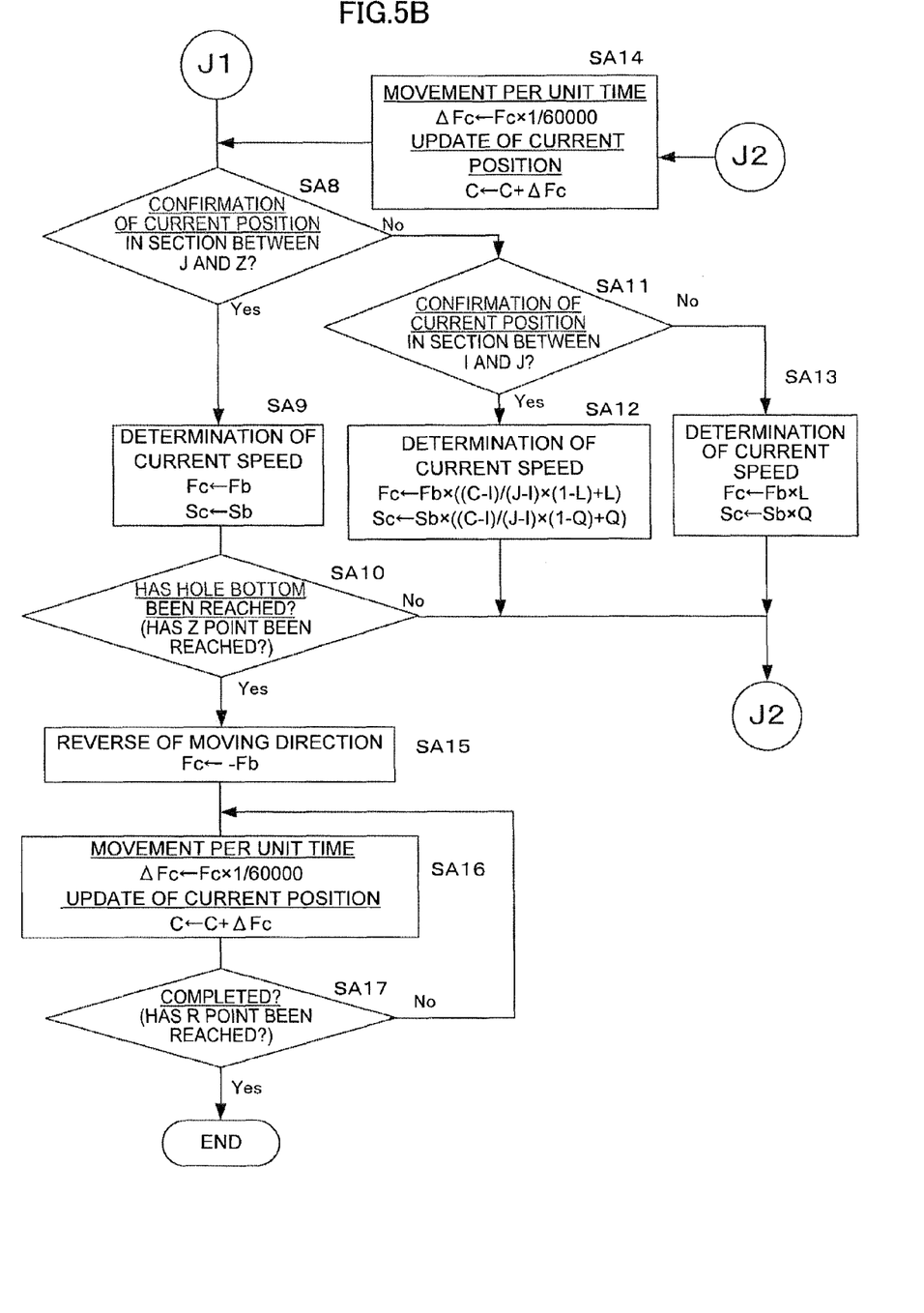
FIG. 5B is a flowchart of the flow of the calculation method in the embodiment.

The calculation method in the first embodiment will be described step by step with reference to FIGS. 5A and 5B. The first embodiment includes the case where specification has been omitted for the speed ratio L and the speed ratio Q in the third embodiment. It should be noted that in the flowcharts shown in FIGS. 5A and 5B, the unit time, the unit of the position, the unit of the feed speed, and the unit of the spindle rotation speed are 1[msec], [mm], [mm/min], and [rotations/min], respectively.

(Step SA1) A drilling instruction code is analyzed.

(Step SA2) Data setting is performed. The hole bottom position is set to Z. The reference position which is the drilling instruction start position is set to R. The reference feed speed which is the feed speed during drilling is set to Fb. The reference spindle rotation speed which is the spindle rotation speed during drilling is set to Sb. The specified arbitrary area start position is set to I. The specified arbitrary area end position is set to J. The speed ratio with respect to the reference feed speed Fb from the reference position R to the specified arbitrary area start position I is set to L. The speed ratio with respect to the reference spindle rotation speed Sb from the reference position R to the specified arbitrary area start position I is set to Q.

(Step SA3) A determination is made whether the speed ratio with respect to the reference feed speed Fb from the reference position R to the specified arbitrary area start position I is instructed as L. If instructed (Yes), the flow proceeds to step SA5. If not instructed (No), the flow proceeds to step SA4.

(Step SA4) The feed speed ratio L is calculated. The set feed speed instructed for the area immediately before the reference position R which is the drilling instruction start position is set as Fp, and the value of Fp/Fb is set as L. The flow then proceeds to step SA5.

(Step SA5) A determination is made whether the speed ratio with respect to the reference spindle rotation speed Sb from the reference position R to the specified arbitrary area start position I is instructed as Q. If instructed (Yes), the flow proceeds to step SA7. If not instructed (No), the flow proceeds to step SA6.

(Step SA6) The spindle rotation speed ratio Q is calculated. The set spindle rotation speed instructed for the area immediately before the reference position R which is the drilling instruction start position is set as Sp, and the value of Sp/Sb is set as Q. The flow then proceeds to step SA7.

(Step SA7) The current position C is acquired.

(Step SA8) A determination is made whether the current position C is in the section between J and Z. If the current position C is in the section between J and Z (Yes), the flow proceeds to step SA9. If the current position C is not in the section between J and Z (No), the flow proceeds to step SA11.

(Step SA9) The value of Fb is set as the feed speed Fc, and the value of Sb is set as the spindle rotation speed Sc. The flow then proceeds to step SA10.

(Step SA10) A determination is made whether the current position C has reached the hole bottom position Z. If the current position C has reached the hole bottom position Z (Yes), the flow proceeds to step SA15. If the current position C has not reached the hole bottom position Z (No), the flow proceeds to step SA14.

(Step SA11) A determination is made whether the current position C is in the section between I and J. If the current position C is in the section between I and J (Yes), the flow proceeds to step SA12. If the current position C is not in the section between I and J (No), the flow proceeds to step SA13.

(Step SA12) The value of Fb×((C−I)/(J−I)×(1−L)+L) is set as the feed speed Fc, and the value of Sb×((C−I)/(J−I)×(1−Q)+Q) is set as the spindle rotation speed Sc. The flow then proceeds to step SA14.

(Step SA13) Assuming the current position C is in the section between R and I, the value of Fb×L is set as the feed speed Fc, and the value of Sb×Q is set as the spindle rotation speed Sc. The flow then proceeds to step SA14.

(Step SA14) By the addition of Fc×1/60000 as the movement ΔFc per unit time to the current position C, the current position C is updated. The flow then returns to step SA8.

(Step SA15) The value of −Fb is set as the feed speed Fc to move from the hole bottom position Z to the reference position R.

(Step SA16) By the addition of Fc×1/60000 as the movement ΔFc per unit time to the current position C, the current position C is updated.

(Step SA17) A determination is made whether the current position C has reached the reference position R. If the current position C has reached the reference position R (Yes), the processing is completed. If the current position C has not reached the reference position R (No), the flow returns to step SA16.

Figure 6A:
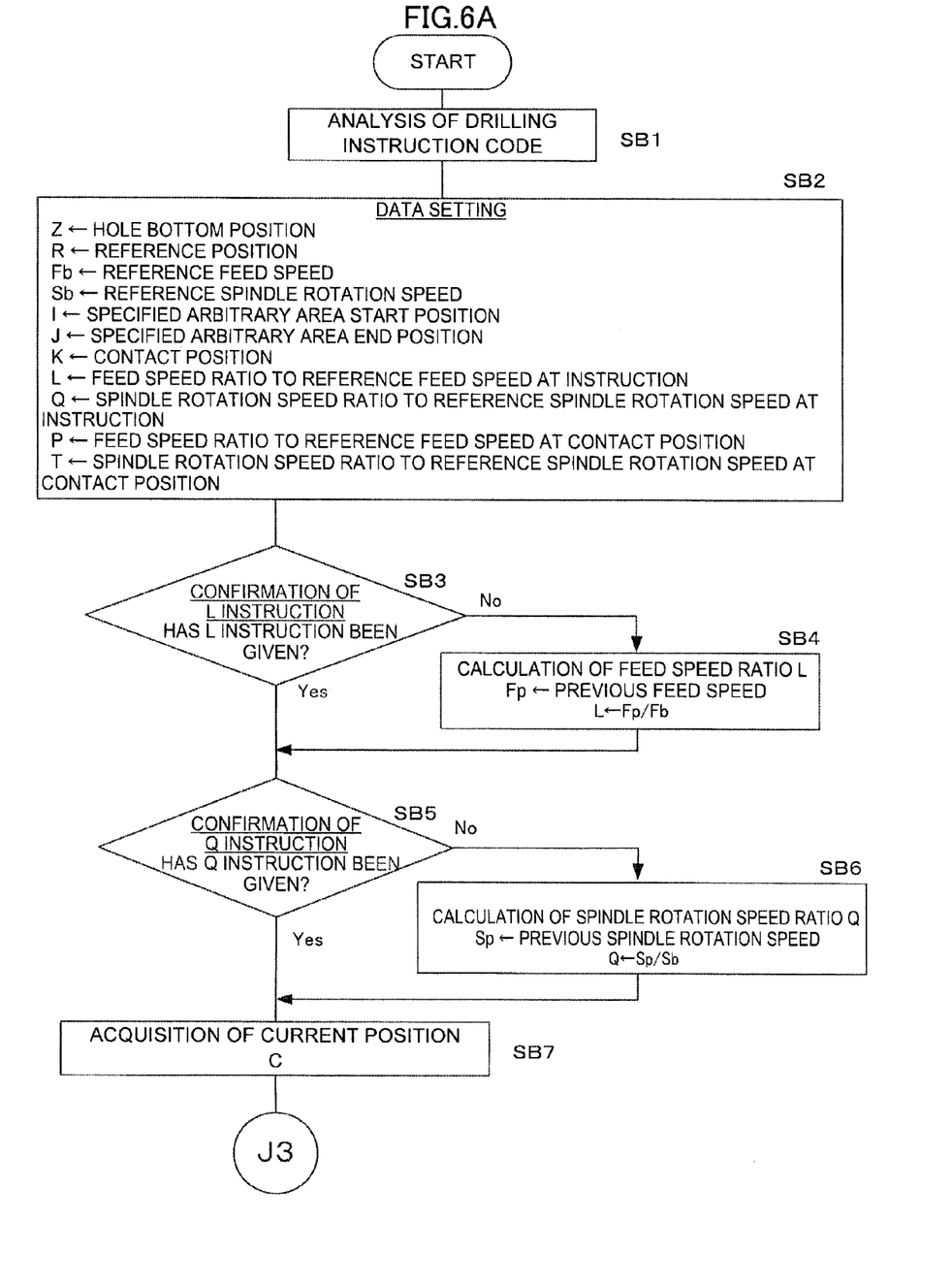
FIG. 6A is a flowchart of the flow of a calculation method in an embodiment.
Figure 6B:
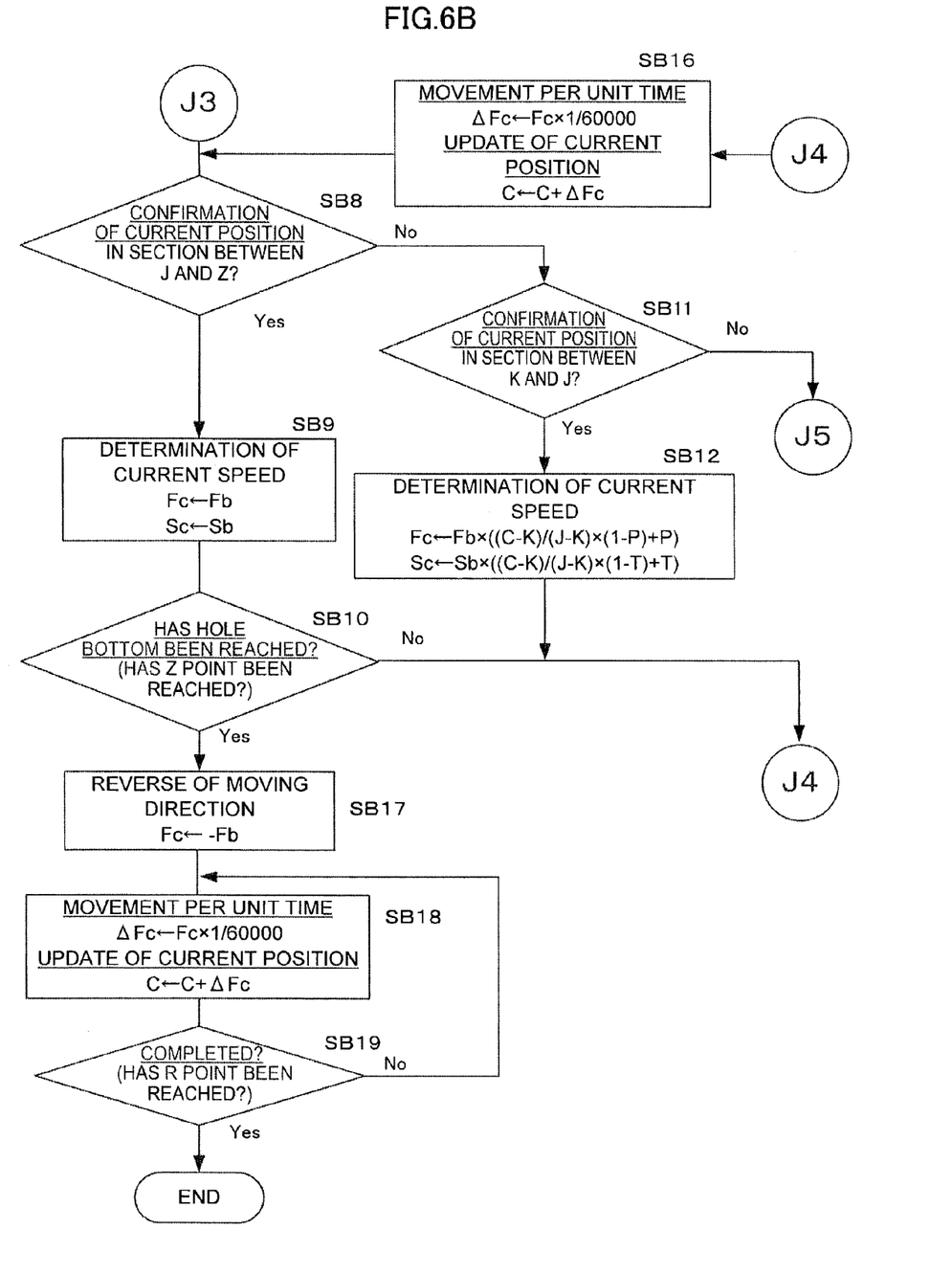
FIG. 6B is a flowchart of the flow of the calculation method in the embodiment.
Figure 6C:
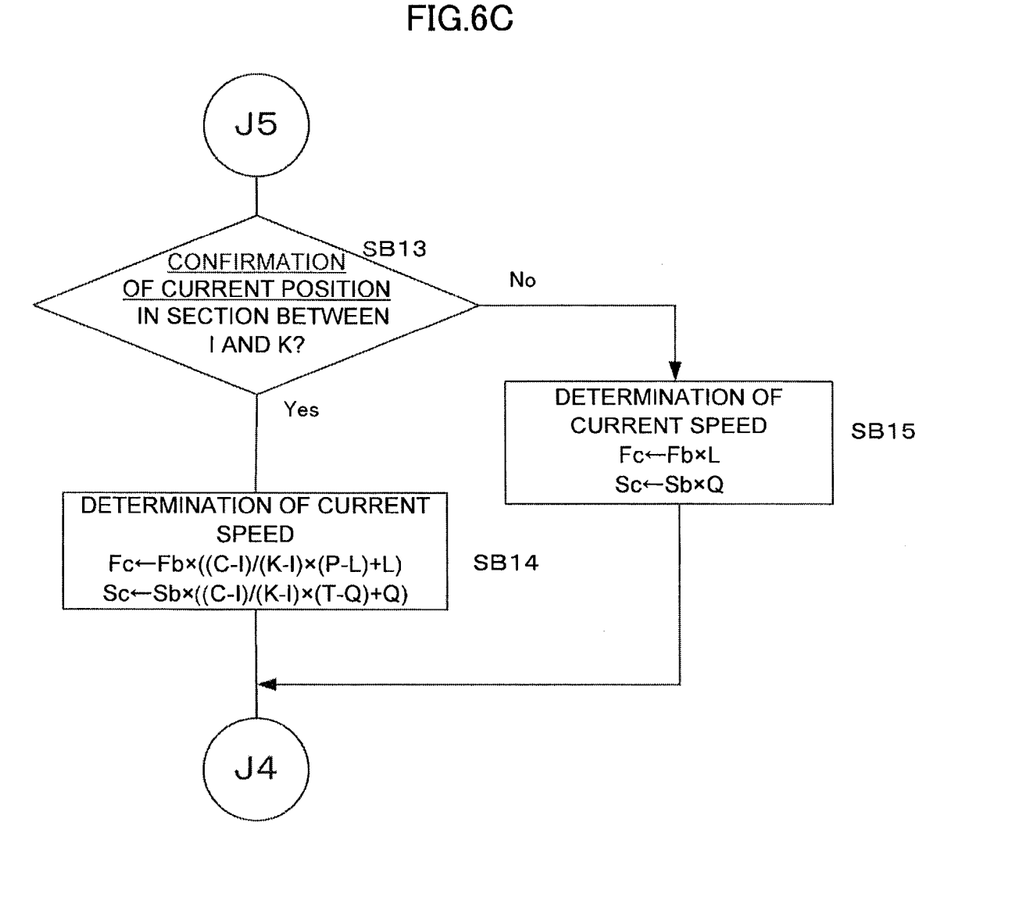
FIG. 6C is a flowchart of the flow of the calculation method in the embodiment.

The calculation method in the second embodiment will be next described step by step with reference to FIGS. 6A, 6B, and 6C. The second embodiment includes the case where specification has been omitted for the speed ratio L and the speed ratio Q in the third embodiment. It should be noted that in the flowcharts shown in FIGS. 6A, 6B, and 6C, the unit time, the unit of the position, the unit of the feed speed, and the unit of the spindle rotation speed are 1 [msec], [mm], [mm/min], and [rotations/min] respectively.

(Step SB1) A drilling instruction code is analyzed.

(Step SB2) Data setting is performed. The hole bottom position is set to Z. The reference position which is the drilling instruction start position is set to R. The reference feed speed which is the feed speed during drilling is set to Fb. The reference spindle rotation speed which is the spindle rotation speed during drilling is set to Sb. The specified arbitrary area start position is set to I. The specified arbitrary area end position is set to J. The contact position is set to K. The speed ratio with respect to the reference feed speed Fb from the reference position R to the specified arbitrary area start position I is set to L. The speed ratio with respect to the reference spindle rotation speed Sb from the reference position R to the specified arbitrary area start position I is set to Q. The feed speed ratio at the contact position is set to P. The spindle rotation speed ratio at the contact position is set to T.

(Step SB3) A determination is made whether the speed ratio with respect to the reference feed speed Fb from the reference position R to the specified arbitrary area start position I is instructed as L. If instructed (Yes), the flow proceeds to step SB5. If not instructed (No), the flow proceeds to step SB4.

(Step SB4) The feed speed ratio L is calculated. The set feed speed instructed for the area immediately before the reference position R which is the drilling instruction start position is set as Fp, and the value of Fp/Fb is set as L. The flow then proceeds to step SB5.

(Step SB5) A determination is made whether the speed ratio with respect to the reference spindle rotation speed Sb from the reference position R to the specified arbitrary area start position I is instructed as Q. If instructed (Yes), the flow proceeds to step SB7. If not instructed (No), the flow proceeds to step SB6.

(Step SB6) The spindle rotation speed ratio Q is calculated. The set spindle rotation speed instructed for the area immediately before the reference position R which is the drilling instruction start position is set as Sp, and the value of Sp/Sb is set as Q. The flow then proceeds to step SB7.

(Step SB7) The current position C is acquired.

(Step SB8) A determination is made whether the current position C is in the section between J and Z. If the current position C is in the section between J and Z (Yes), the flow proceeds to step SB9. If the current position C is not in the section between J and Z (No), the flow proceeds to step SB11.

(Step SB9) The value of Fb is set as the feed speed Fc, and the value of Sb is set as the spindle rotation speed Sc. The flow then proceeds to step SB10.

(Step SB10) A determination is made whether the current position C has reached the hole bottom position Z. If the current position C has reached the hole bottom position Z (Yes), the flow proceeds to step SB17. If the current position C has not reached the hole bottom position Z (No), the flow proceeds to step SB16.

(Step SB11) A determination is made whether the current position C is in the section between K and J. If the current position C is in the section between K and J (Yes), the flow proceeds to step SB12. If the current position C is not in the section between K and J (No), the flow proceeds to step SB13.

(Step SB12) The value of Fb×((C−K)/(J−K)×(1−P)+P) is set as the feed speed Fc, and the value of Sb×((C−K)/(J−K)×(1−T)+T) is set as the spindle rotation speed Sc. The flow then proceeds to step SB16.

(Step SB13) A determination is made whether the current position C is in the section between I and K. If the current position C is in the section between I and K (Yes), the flow proceeds to step SB14. If the current position C is not in the section between I and K (No), the flow proceeds to step SB15.

(Step SB14) The value of Fb×((C−I)/(K−I)×(P−L)+L) is set as the feed speed Fc, and the value of Sb×((C−I)/(K−I)×(T−Q)+Q) is set as the spindle rotation speed Sc. The flow then proceeds to step SB16.

(Step SB15) Assuming the current position C is in the section between R and I, the value of Fb×L is set as the feed speed Fc, and the value of Sb×Q is set as the spindle rotation speed Sc. The flow then proceeds to step SB16.

(Step SB16) By the addition of Fc×1/60000 as the movement ΔFc per unit time to the current position C, the current position C is updated. The flow then returns to step SB8.

(Step SB17) The value of −Fb is set as the feed speed Fc to move from the hole bottom position Z to the reference position R.

(Step SB18) By the addition of Fc×1/60000 as the movement ΔFc per unit time to the current position C, the current position C is updated.

(Step SB19) A determination is made whether the current position C has reached the reference position R. If the current position C has reached the reference position R (Yes), the processing is completed. If the current position C has not reached the reference position R (No), the flow returns to step SB18.

The invention claimed is:

1. A numerical controller that includes a feed shaft configured to move a rotary tool and a spindle configured to rotatably drive the rotary tool to perform drilling work for forming a hole in a workpiece using to rotary tool, the numerical controller comprising:
a specified arbitrary area setting unit configured to set a specified arbitrary area including a contact position where the workpiece and the rotary tool come in contact with each other for the first time, above and below the contact position in the machining direction of the rotary tool;
an updating unit configured to update a current position of the feed shaft configured to move the rotary tool;
a speed changing unit configured to accelerate a feed speed of the feed shaft and a spindle rotation speed of the spindle in accordance with the current position of the rotary tool when the current position of the rotary tool is in the specified arbitrary area;

an instructing unit configured to instruct:
a hole bottom position being the position where drilling ends,
a drilling instruction start position,
a reference feed speed as a feed speed during drilling after an end position of the specified arbitrary area,
a reference spindle rotation speed as a spindle rotation speed during drilling after the end position of the specified arbitrary area,
a specified arbitrary area start position,
a specified arbitrary area end position,
a specified arbitrary feed speed ratio of the feed speed of the feed shaft from the drilling instruction start position to the specified arbitrary area start position with respect to the reference feed speed, and
a specified arbitrary spindle rotation speed ratio of the spindle rotation speed of the spindle from the drilling instruction start position to the specified arbitrary area start position with respect to the reference spindle rotation speed; and
a speed ratio calculating unit configured to, in the specified arbitrary area, calculate a feed speed ratio of the feed shaft of the rotary tool in the current position from the specified arbitrary feed speed ratio and calculate a spindle rotation speed ratio of the spindle from the specified arbitrary spindle rotation speed ratio, wherein
the speed changing unit is further configured to calculate the feed speed and the spindle rotation speed in the current position from the feed speed ratio and the spindle rotation speed ratio, and wherein
the reference feed speed is larger than the feed speed of the feed shaft from the drilling instruction start position to the specified arbitrary area start position, and the reference spindle rotation speed is larger than the spindle rotation speed of the spindle from the drilling instruction start position to the specified arbitrary area start position.

2. The numerical controller according to claim 1, wherein the instructing unit is further configured to instruct:
a contact position where the rotary tool and the workpiece come in contact with each other for the first time in the specified arbitrary area,
a contact position feed speed ratio of the feed speed of the feed shaft at the contact position with respect to the reference feed speed, wherein the feed speed of the feed shaft at the contact position is smaller than the reference feed speed and is larger than the feed speed of the feed shaft from the drilling instruction start position to the specified arbitrary area start position, and
a contact position spindle rotation speed ratio of the spindle rotation speed of the spindle rotation at the contact position with respect to the reference spindle rotation speed, wherein the spindle rotation speed of the spindle rotation at the contact position is smaller than the reference spindle rotation speed and is larger than the spindle rotation speed of the spindle rotation from the drilling instruction start position to the specified arbitrary area start position with respect to the spindle rotation speed during drilling in the contact position,
the speed ratio calculating unit is configured to:
calculate a first feed speed ratio from the specified arbitrary feed speed ratio and the contact position feed speed ratio,
calculate a first spindle rotation speed ratio from the specified arbitrary spindle rotation speed ratio and the contact position spindle rotation speed ratio in the current position from the specified arbitrary area start position to the contact position,
calculate a second feed speed ratio from the contact position feed speed ratio, and
calculate a second spindle rotation speed ratio from the contact position spindle rotation speed ratio in the current position from the contact position to the specified arbitrary area end position, and
the speed changing unit is configured to:
calculate the feed speed and the spindle rotation speed in the current position from the first feed speed ratio and the first spindle rotation speed ratio in the current position from the specified arbitrary area start position to the contact position, and
calculate the feed speed and the spindle rotation speed in the current position from the second feed speed ratio and the second spindle rotation speed ratio in the current position from the contact position to the specified arbitrary area end position.

3. The numerical controller according to claim 1, wherein, in a case where at least one of instructions for the specified arbitrary feed speed ratio and the specified arbitrary spindle rotation speed ratio is omitted, the speed ratio calculating unit calculates the specified arbitrary feed speed ratio and the specified arbitrary spindle rotation speed ratio from a set feed speed instructed for the area immediately before the drilling instruction start position, the reference feed speed during drilling, a set spindle rotation speed instructed for the area immediately before the drilling instruction start position, and the reference spindle rotation speed during drilling.

4. The numerical controller according to claim 2, wherein, in a case where at least one of instructions for the specified arbitrary feed speed ratio and the specified arbitrary spindle rotation speed ratio is omitted, the speed ratio calculating unit calculates the specified arbitrary feed speed ratio and the specified arbitrary spindle rotation speed ratio from a set feed speed instructed for the area immediately before the drilling instruction start position, the reference feed speed during drilling, a set spindle rotation speed instructed for the area immediately before the drilling instruction start position, and the reference spindle rotation speed during drilling.

* * * * *